(12) United States Patent
Uesugi

(10) Patent No.: US 11,022,202 B2
(45) Date of Patent: Jun. 1, 2021

(54) DRIVING FORCE TRANSMISSION MECHANISM AND IMAGE FORMING APPARATUS

(71) Applicant: CANON KABUSHIKI KAISHA, Tokyo (JP)

(72) Inventor: Takuji Uesugi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 489 days.

(21) Appl. No.: 15/648,674

(22) Filed: Jul. 13, 2017

(65) Prior Publication Data
US 2018/0017138 A1 Jan. 18, 2018

(30) Foreign Application Priority Data

Jul. 14, 2016 (JP) .............................. JP2016-139066

(51) Int. Cl.
*F16H 3/66* (2006.01)
*F16H 3/60* (2006.01)
(Continued)

(52) U.S. Cl.
CPC .............. *F16H 3/666* (2013.01); *F16H 3/60* (2013.01); *G03G 15/6529* (2013.01); *G03G 21/1647* (2013.01); *B41J 29/38* (2013.01); *B65H 5/062* (2013.01); *F16H 2200/2005* (2013.01); *G03G 2221/1657* (2013.01)

(58) Field of Classification Search
None
See application file for complete search history.

(56) References Cited

U.S. PATENT DOCUMENTS 1,330,822 A * 2/1920 Stanley .................... F16H 3/60
475/315
2,521,239 A * 9/1950 Mcdowall ................ F16H 3/60
475/120
(Continued)

FOREIGN PATENT DOCUMENTS

JP 2007-022763 A 2/2007
JP 2007-198491 A 8/2007
(Continued)

OTHER PUBLICATIONS

Copending, unpublished U.S. Appl. No. 15/682,902, filed Aug. 22, 2017.

*Primary Examiner* — Jill E Culler
(74) *Attorney, Agent, or Firm* — Venable LLP

(57) ABSTRACT

A driving force transmission mechanism include a carrier, an input gear, first gears, second gears, an output gear, a clutch portion configured to integrate one of the input and output gears with the carrier or configured to disintegrate the one gear and the carrier, and an actuator configured to restrict rotation of the clutch. When the actuator does not restrict the rotation of the clutch portion, the input gear, the first gears, the second gears and the output gear are integrated with each other, and the output gear is rotated together with the input gear in a first direction. When the actuator restricts the rotation of the clutch portion, a rotational driving force is transmitted from the input gear to the output gear via the first gars and the second gears, and the output gear is rotated in a second direction opposite to the first direction.

12 Claims, 10 Drawing Sheets

(51) Int. Cl.
  *G03G 21/16* (2006.01)
  *G03G 15/00* (2006.01)
  *B41J 29/38* (2006.01)
  *B65H 5/06* (2006.01)

(56) References Cited

U.S. PATENT DOCUMENTS

| | | | | |
|---|---|---|---|---|
| 2,935,901 | A * | 5/1960 | Petronovich | B63H 23/08 |
| | | | | 475/327 |
| 5,168,319 | A * | 12/1992 | Kimura | G03G 15/0126 |
| | | | | 399/227 |
| 8,298,112 | B2 | 10/2012 | Takada | |
| 9,501,020 | B2 * | 11/2016 | Yamaguchi | G03G 15/6529 |
| 2008/0216690 | A1* | 9/2008 | Kumadaki | G03G 15/6564 |
| | | | | 101/248 |
| 2012/0046142 | A1* | 2/2012 | Miyawaki | G03G 15/757 |
| | | | | 475/331 |
| 2012/0197472 | A1* | 8/2012 | He | B60K 6/105 |
| | | | | 701/22 |
| 2013/0101314 | A1* | 4/2013 | Yasuda | G03G 15/757 |
| | | | | 399/167 |
| 2015/0090563 | A1 | 4/2015 | Uesugi et al. | |
| 2015/0301492 | A1* | 10/2015 | Ochi | B65H 85/00 |
| | | | | 271/225 |
| 2017/0137085 | A1* | 5/2017 | Yamamoto | B62M 11/145 |

FOREIGN PATENT DOCUMENTS

| | | |
|---|---|---|
| JP | 2008-304050 A | 12/2008 |
| JP | 2015068470 A | 4/2015 |
| JP | 2015-092104 A | 5/2015 |

* cited by examiner (a)

(b)

DRIVING FORCE TRANSMISSION MECHANISM AND IMAGE FORMING APPARATUS

FIELD OF THE INVENTION AND RELATED ART

The present invention relates to a driving force transmission mechanism for outputting a unidirectional rotational driving force inputted from a driving source by switching a direction of forward and reverse (backward) rotation, and an image forming apparatus including the driving force transmission mechanism.

In an image forming apparatus having a constitution in which a plurality of rotatable members are driven by a unidirectional rotational driving force, a driving force transmission mechanism for permitting switching only a rotational direction of a part of the rotatable members is provided in some cases. As a conventional driving force transmission mechanism, a mechanism using an internal (tooth) gear has been known (Japanese Laid-Open Patent Application (JP-A) 2015-092104).

The driving force transmission mechanism disclosed in JP-A 2015-092104 is constituted by a driving (force) input gear and a driving (force) output gear each including external gear and internal gear which are coaxially provided, two idler gears engageable with the internal gear of the driving input gear and the driving output gear, respectively, to transmit a driving force, a gear carrier for holding the gears, and a clutch portion for selecting integration of the gear carrier with the driving input gear or stop of the integration of the gear carriers. The clutch portion is operated by a solenoid and when rotation of the gear carrier is stopped, the idler gears rotate, so that the driving output gear is reversely rotated relative to the driving input gear. When the gear carrier and the driving input gear are integrated with each other by the clutch portion, all of constituent elements are rotated as a unit, so that a rotational direction of the driving output gear and a rotational direction of the driving input gear are the same. That is, rotation of the clutch portion and stop of the rotation of the clutch portion are selected by operating the solenoid, so that a driving (force) outputting direction can be arbitrarily switched.

In the driving force transmission mechanism disclosed in JP-A 2015-092104, each of the input gear and the output gear includes the internal gear, and the two idler gears engaging with the internal gears are disposed inside the internal gears. An engaging portion of these two idler gears is positioned at a rotation center of an entirety of the unit, and therefore, a rotation center shaft penetrating through the entirety of the unit cannot be provided, so that there is a need that two separate carriers for holding the respective gears are provided and co-axially of the two rotation shafts is satisfied. For that reason, in the driving force transmission mechanism disclosed in JP-A 2015-092104, a constitution of a supporting portion for supporting each of the gears has been complicated and a high dimensional accuracy of the gears has been required. Further, there was a problem such that engaging positions among the input gears, the output gear and the two idler gears are not symmetrical with each other with respect to a rotation center of the unit and thus the center of gravity of the entirety of the unit is deviated from the rotation center and rotates while being in an eccentric state and therefore stability of the unit during rotation lowers.

SUMMARY OF THE INVENTION

A principal object of the present invention is to provide a driving force transmission mechanism capable of being downsized by simplifying constituent elements and capable off improving stability during rotation.

According to an aspect of the present invention, there is provided a driving force transmission mechanism capable of changing a rotational direction of an output gear, comprising: a carrier including a shaft portion at a center thereof; an input gear to which a driving force is inputted from a driving source, wherein the input gear includes first teeth to which the driving force is inputted and second teeth in an output side and is rotatably held about the shaft portion of the carrier; a plurality of first gears engaging with the second teeth of the input gear, the first gears are provided symmetrically with each other with respect to the shaft portion of the carrier and are rotatably held by the carrier; a plurality of second gears engaging with the first gears, respectively, the second gears are provided symmetrically with each other with respect to the shaft portion of the carrier and are rotatably held by the carrier; an output gear engaging with the second gears and rotatably held by the shaft portion of the carrier; a clutch portion configured to integrate one of the input gear and the output gear with the carrier or configured to disintegrate the one gear and the carrier; and an actuator configured to restrict rotation of the clutch, wherein the actuator does not restrict the rotation of the clutch portion so that one of the input gear and the output gear are integrated with the carrier, or restricts the rotation of the clutch portion so that the one gear and the carrier are disintegrated, wherein when the actuator does not restrict the rotation of the clutch portion, the input gear, the first gears, the second gears and the output gear are integrated with each other, and the output gear is rotated together with the input gear in a first direction, and wherein when the actuator restricts the rotation of the clutch portion, a rotational driving force is transmitted from the input gear to the output gear via the first gars and the second gears, and the output gear is rotated in a second direction opposite to the first direction.

Further features of the present invention will become apparent from the following description of exemplary embodiments with reference to the attached drawings.

DESCRIPTION OF EMBODIMENTS

Embodiments of the present invention will be specifically described based on embodiments with reference to the drawings. Dimensions, materials, shapes and relative arrangements of constituent elements described in the following embodiments should be appropriately be changed depending on structures and various conditions of mechanisms (apparatuses) to which the present invention is applied. Accordingly, the scope of the present invention is not intended to be limited to the following embodiments.

Embodiment 1

With reference to FIGS. 1 to 6, a driving force transmission mechanism and an image forming apparatus according to Embodiment 1 of the present invention will be described.
<Image Forming Apparatus>

Figure 1:
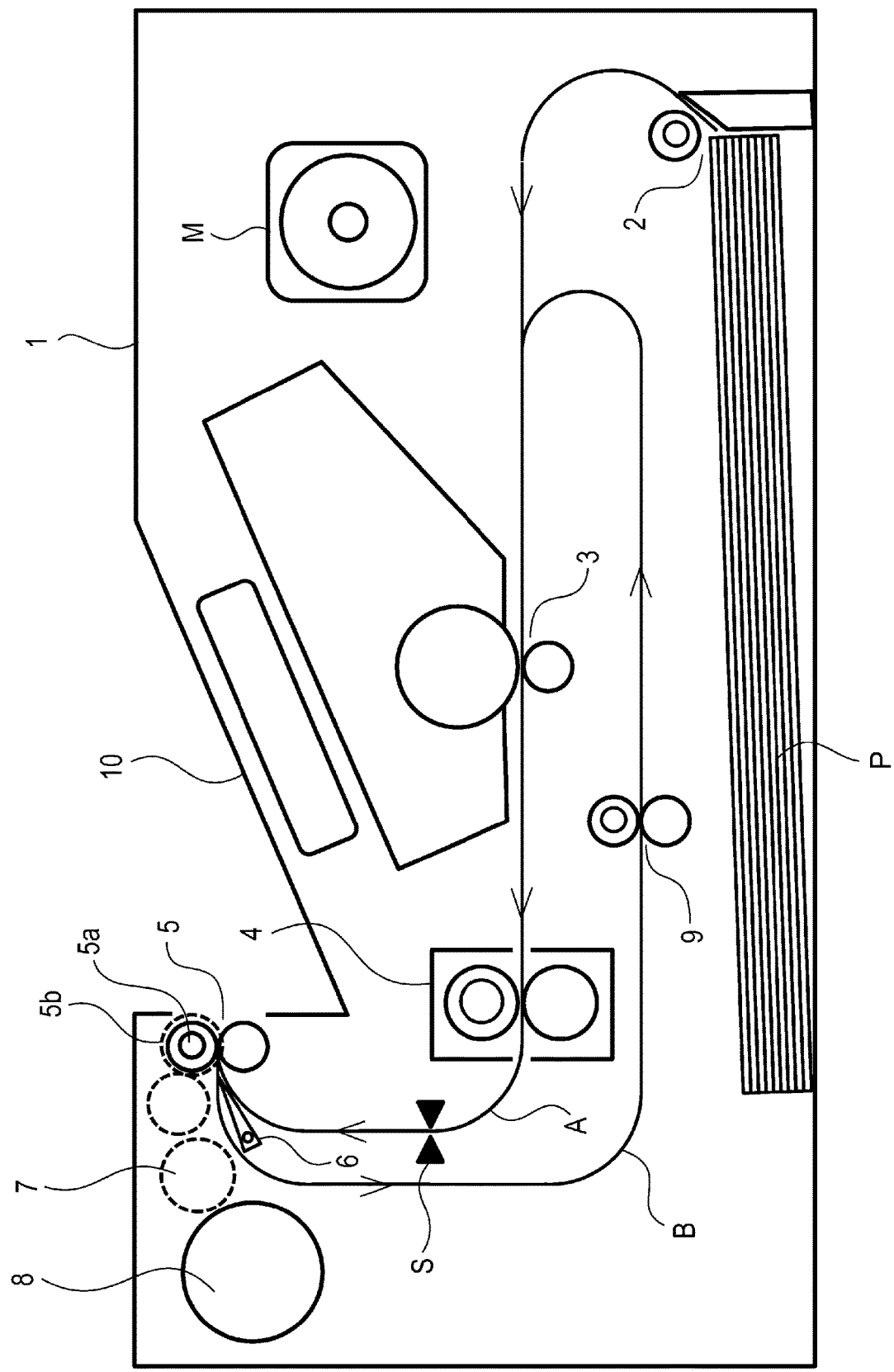
FIG. 1 is a schematic sectional view showing a structure of an image forming apparatus.

The image forming apparatus according to Embodiment 1 of the present invention will be described with reference to FIG. 1. FIG. 1 is a schematic sectional view showing a general structure of an image forming apparatus 1 in this embodiment. As the image forming apparatus 1 in this embodiment, a copying machine, a printer or the like capable of carrying out double-side printing is used.

In the case where the double-side printing is carried out in the image forming apparatus 1 in this embodiment, as shown in FIG. 1, a sheet P as a recording material passes through a feeding path. A starting from a sheet feeding portion 2 and passing through an image forming portion 3 and a fixing portion 4, so that an image is printed on a first surface (front surface). Thereafter, before a trailing end of the sheet P passes through a sheet discharging roller (rotatable member) 5a at a sheet discharging portion 5, a rotational direction of the sheet discharging roller 5a is switched from a direction (second direction) of discharging the sheet P onto a sheet discharge tray 10 to a direction (first direction) of switching-back the sheet P. As a result, a feeding direction of the sheet P is reversed. The sheet P is passed through a feeding path B by a transmitting member 6 and is fed to an upstream side of the image forming portion 3 through a feeding path for double-side printing. Then, the image is printed on a second surface (back surface) of the sheet P in the feeding path A, and the sheet P is discharged onto the sheet discharge tray 10. A sheet feeding direction from the sheet feeding portion 2 to the feeding position 9 for double-side printing via the image forming portion 3 and the fixing portion is one direction, and therefore respective driving portions are driven by a motor M rotatable in a certain direction. In order to arbitrarily reverse the rotational direction of the sheet discharging roller 5a during the double-side printing, the image forming apparatus 1 in this embodiment includes a driving force transmission mechanism 8 capable of outputting the rotational driving force after switching only an output direction (rotational direction) of the rotational driving force while maintaining the unidirectional rotation for inputting the rotational driving force to the driving portion.

In this embodiment, a sheet discharge direction of discharging the sheet P onto the sheet discharge tray 10 is a second direction, and a switch-back direction which is an opposite direction to the sheet discharge direction is a first direction opposite to the second direction.
<Driving Force Transmission Mechanism>

Figure 2:
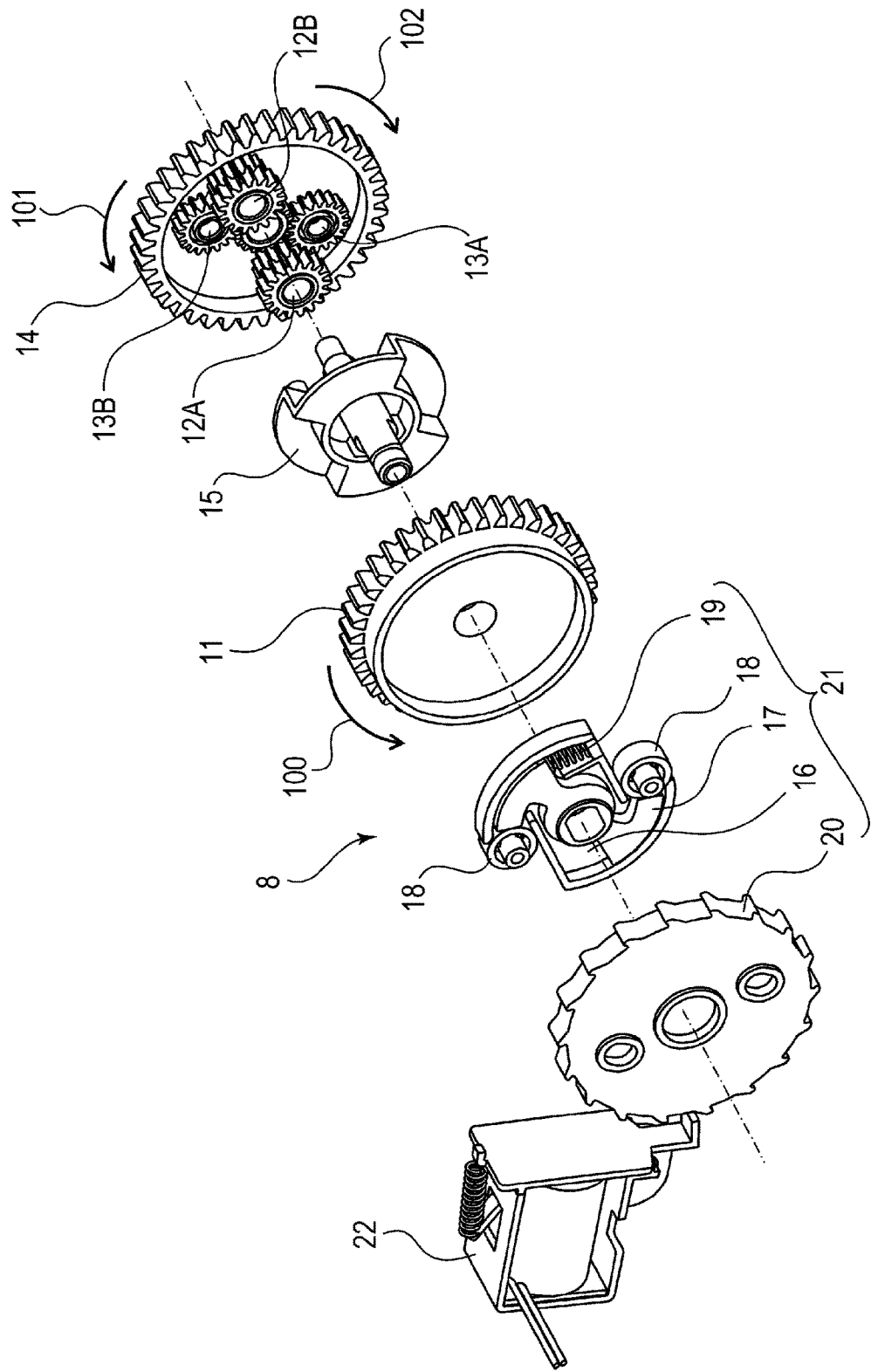
FIG. 2 is a perspective view showing a structure of a driving force transmission mechanism according to Embodiment 1.

A schematic constitution of the driving force transmission mechanism in this embodiment will be described with reference to FIG. 2. FIG. 2 is an exploded perspective view showing a structure of a driving force transmission mechanism 8 in this embodiment.

The driving force transmission mechanism 8 includes an input gear 11, an output gear 14, stepped gears 12A and 12B idler gears 13A and 13B, a carrier 15 and a clutch portion 21. The input gear 11 rotates by receiving a driving force from the motor M through an unshown driving gear train. The output gear 14 outputs the driving force to a sheet discharging roller driving gear train 7 (FIG. 1) for rotating the sheet discharging roller 5a. The input gear 11 and the output gear 14 are coaxially disposed with each other, and are rotatably held by the carrier 15.

The stepped gears 12A and 12B and the idler gears 13A and 13B are gears for transmitting the driving force from the input gear 11 to the output gear 14, and are rotatably held by the carrier 15. The stepped gears 12A and 12B are a plurality of first gears disposed symmetrically with respect to a rotation center (carrier shaft portion) of the driving force transmission mechanism 8 and are disposed at a plurality of positions which are symmetrical with respect to a rotation shaft center of the carrier 15. The idler gears 13A and 13B are a plurality of second gears disposed symmetrically with respect to a rotation center (carrier shaft portion) of the driving force transmission mechanism 8, and the idler gears are the same in number as the stepped gears are disposed at a plurality of positions which are symmetrical with respect to a rotation shaft center of the carrier 15.

A retainer 17 is rotatably held by a clutch holder 16 is urged by an urging spring (urging portion) 19 in a direction of rotating relative to the clutch holder 16. The retainer 17 is a pressing portion for pressing a roller 18 so that the input gear 11 and the clutch holder 16 are moved to a constraining position where the input gear 11 and the clutch holder 16 are constrained and integrated with each other. The clutch holder 16 is disposed so as to sandwich the input gear 11 between itself and the carrier 15, and thus is integrated with the carrier 15. The roller 18 is disposed between the input gear 11 and the clutch holder 16 and constitutes the clutch portion 21 in combination with the clutch holder 16, the retainer 17, the urging spring 19 and a clutch disk 20.

The clutch disk 20 is constituted not only so as to control an operation of the roller 18 but also so that rotation of the clutch disk 20 itself is locked by a solenoid 20 as an actuator. The retainer 17 urges (presses) the roller 18 positioned between the input gear 11 and the clutch holder 16 toward a narrow portion between the input gear 11 and the clutch holder 16 by an urging force of the urging spring (urging portion) 19. As a result, the roller 18 (constraining portion) moves to the constraining position where the input gear 11 and the clutch holder 16 are constrained and integrated with each other, so that the roller 18 contacts both of the input gear 11 and the clutch holder 16, so that the input gear 11 and the clutch holder 16 are constrained and integrated with each other by a frictional force. By controlling the roller 18 (constraining portion) by the clutch disk 20, the roller 18 is moved to a non-constraining position where the input gear 11 and the clutch holder 16 are not constrained and integrated with each other, and constraint and integration of the input gear 11 and the clutch holder 16 can be eliminated.

Figure 3:
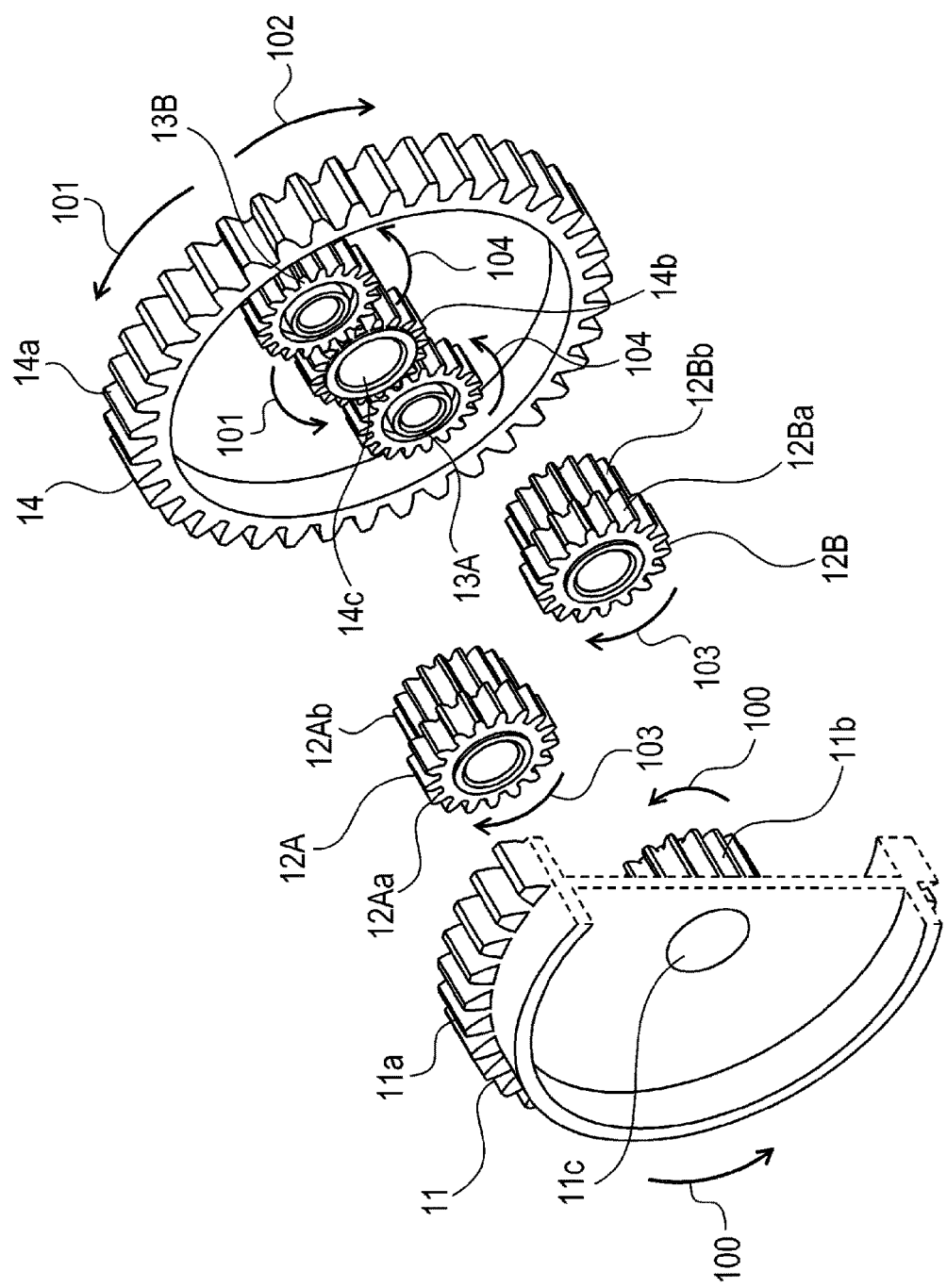
FIG. 3 is a perspective view showing a structure of gears of the driving force transmission mechanism in Embodiment 1.
Figure 4:
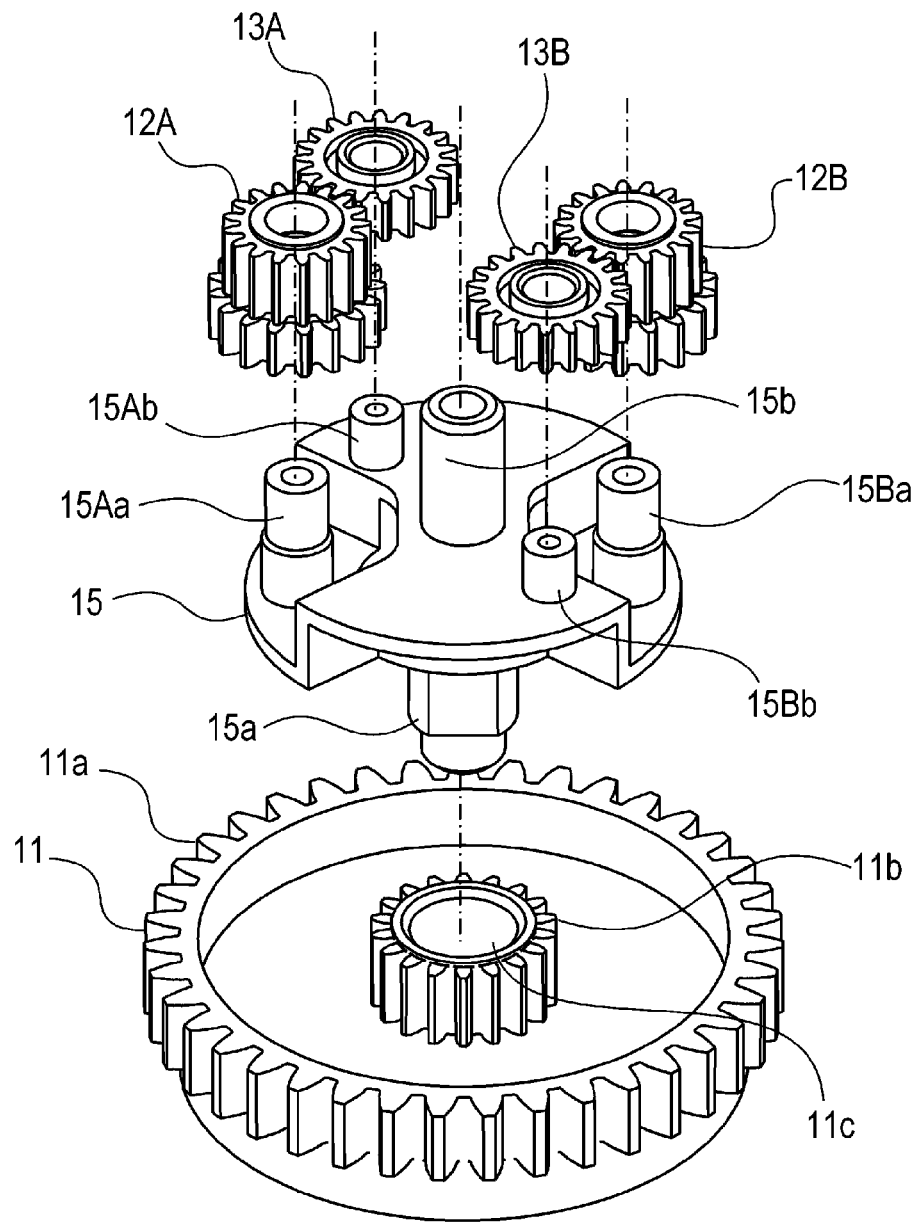
FIG. 4 is a perspective view showing a structure of the gears and a carrier of the driving force transmission mechanism in Embodiment 1.

An engagement relationship among the input gear 11, the output gear 14, the stepped gears 12A and 12B and the idler gears 13A and 13B will be described with reference to FIGS. 3 and 4. FIG. 3 is an exploded perspective view showing a part of the structure of the driving force transmission mechanism 8, in which parts other than the gears are omitted from illustration. FIG. 4 is an exploded perspective view showing a relationship of all of the gears except for the output gear 14 with the carrier 15 holding the gears.

The input gear 11 includes teeth (first teeth) 11a to which a rotational driving force is inputted in engagement thereof with an unshown driving gear train, teeth (second teeth) 11b engaging with the stepped gears 12A and 12B, and a hole 11c into which a shaft portion 15a of the carrier 15 is inserted. The input gear 11 is rotatably supported by the shaft portion 15a of the carrier 15. The stepped gears 12A and 12B are the same-shaped parts and are rotatably supported by rotation shafts 15Aa and 15Ba of the carrier 15, respectively. The stepped gears 12A and 12B engage with the teeth 11b of the input gear 11 by teeth 12Aa and 12Ba, respectively. Here, external teeth refer to a gear portion where projections of teeth extend toward an outside with respect to the rotation center. On the other hand, internal teeth refer to a gear portion where projections of teeth extend toward the rotation center. The idler gears 13A and 13B are the same-shaped parts and are rotatably supported by rotation shafts 15Ab and 15Bb of the carrier 15, respectively. The idler gear 13A engages with the teeth 12Ab of the stepped gear 12A, and the idler gear 13B engages with the teeth 12Bb of the stepped gear 12B. The output gear 14 includes teeth 14a for outputting the rotational driving force to the sheet discharging roller driving gear train 7 (FIG. 1), teeth 14B engaging with the idler gears 13A and 13B, and a hole 14c into which the shaft portion 15b of the carrier 15 is inserted. The output gear 14 is rotatably supported by the shaft portion 15b of the carrier 15. The shaft portions 15a and 15b of the carrier 15 are coaxially provided. That is, the input gear 11 rotatably supported by the shaft portion 15a and the output gear 14 rotatably supported by the shaft portion 15b of the carrier 15 rotate coaxially. The teeth 11b of the input gear 11 engage with the teeth 12Aa and 12Ba of the stepped gears 12A and 12B, the teeth 12Aa and 12Ba engage with the idler gears 13A and 13B, and the idler gears 13A and 13B engage with the teeth 14b of the output gear 14. As a result, the driving force is successively transmitted from the input gear 11 to the output gear 14.

The above-constituted driving force transmission mechanism 8 generates the rotational driving force in an arrow 100 direction which is one direction at the teeth 11a of the input gear 11 from the motor M as the driving source via the unshown gear train. A sheet discharging roller gear 5b for rotating the sheet discharging roller 5a shown in FIG. 1 acquires the driving force from the teeth 14a of the output gear 14 via the sheet discharging roller driving gear train 7, and the rotational direction of the output gear 14 is switched, so that also the sheet discharging roller 5a follows the output gear 14 to carry out reverse of drive.

<Normal Rotation Operation>

A normal rotation operation of the driving force transmission mechanism 8 for rotationally driving the sheet discharging roller 5a in the sheet discharging direction of the sheet P will be described. During the normal rotation operation, in the driving force transmission mechanism 8, the rotational driving force in the arrow 100 direction (first direction) inputted to the input gear 11 is outputted, as the rotational driving force in an arrow 102 direction (second direction), from the output gear 14. During the normal rotation operation, in the driving force transmission mechanism 8, energization to an electromagnet of the solenoid 22 is turned off (OFF), so that a state in which rotation of the clutch disk 20 as an acted member is restricted (prevented) by an armature (movable portion) of the solenoid 22 located at an acting position is formed. The rotation of the clutch disk 20 is restricted, whereby the roller 18 of the clutch portion 21 is not only kept in a state in which a contact state thereof with the input gear 11 is eliminated but also in a state in which the rotation of the carrier 15 and the clutch portion 21 is restricted. The rotational driving force in the arrow 100 direction inputted to the input gear 11 is transmitted to the output gear 14 via the stepped gears 12A and 12B and the idler gears 13A and 13B which are rotatably supported by the carrier 15 which is at rest, and is outputted as the rotational driving force in the arrow 102 direction which is an opposite direction to the arrow 100 direction. The stepped gears 12A and 12B engage with the teeth 11b of the input gear 11, and therefore, rotate in the direction opposite to the rotational direction of the input gear 11. The idler gears 13A and 13B engage with the stepped gears 12A and 12B, respectively, and therefore, rotate in the direction opposite to the rotational directions of the stepped gears 12A and 12B. The output gear 14 engages with the idler gears 13A and 13B by the teeth 14b thereof, and therefore, rotates in the direction opposite to the rotational directions of the idler gears 13A and 13B. From the input gear 11 to the output gear 14, reverse in rotational direction of the driving force is carried out three times.

<Reverse Rotation Operation>

A reverse rotation operation of the driving force transmission mechanism 8 for rotationally driving the sheet discharging roller 5a in a direction opposite to the sheet discharging direction of the sheet P will be described. During the reverse rotation operation, in the driving force transmission mechanism 8, the rotational driving force in the arrow 100 direction (first direction) inputted to the input gear 11 is outputted, as the rotational driving force in an arrow 102 direction (first direction), from the output gear 14. During the reverse rotation operation, in the driving force transmission mechanism 8, energization to an electromagnet of the solenoid 22 is turned on (ON), so that the armature of the solenoid 22 is attracted to the electromagnet and thus is in a non-acting position. There is no restriction by the armature of the solenoid 22, and therefore, the clutch disk 20 is in a freely rotatable state. There is no restriction by the solenoid 22 through the clutch disk 20, and therefore, the roller 18 of the clutch portion 21 is subjected to the urging force of the urging spring 19 and is sandwiched at the narrow portion between the input gear 11 and the clutch holder 16. When the roller 18 simultaneously contacts both of the parts 11 and 16, the clutch holder 16 is in a state in which the clutch holder 16 is locked by the input gear 11 by the frictional force. At this time, the clutch holder 16 is in a state in which the clutch holder 16 rotates integrally with the input gear 11, so that also the carrier 15 integrated with the clutch holder 16, the retainer 17 and the urging spring 19 which are held by the clutch holder 16, and the clutch disk 20 held by the carrier 15 rotate integrally with the input gear 11. The stepped gears 12A and 12B supported by the carrier 15 are maintained in a state in which the stepped gears 12A and 12B are rest relative to the carrier 15 (i.e., fixed to the carrier 15) since a relative displacement is not generated between the carrier 15 and the input gear 11. Similarly, the idler gears 13A and 13B supported by the carrier 15 are maintained in a state in which the idler gears 13A and 13B are rest relative to the carrier 15 (i.e., fixed to the carrier 15) since a relative displacement is not generated between the stepped gears 12A and 12B and the carrier 15. Accordingly, the idler gears 13A and 13B are integrated with other constituent members (input gear 11, carrier 15) and circulated and move about the rotation shaft of the input gear 11 in the arrow 100 direction. The rotational driving force in the arrow 100 direction inputted to the input gear 11 is transmitted to the output gear 14 via the idler gears 13, circulating and moving in the same direction, by integral rotation of the input gear 11 with the carrier 15 and the clutch portion 21. The output gear 14 rotates in the arrow 101 direction which is the same direction as the arrow 100 direction by receiving the rotational driving force, at the teeth 14b, from the idler gears 13A and 13B circulating and moving in a fixed state to the carrier 15, and outputs the rotational driving force.

<Switching from Normal Rotation to Reverse Rotation>

Figure 5:
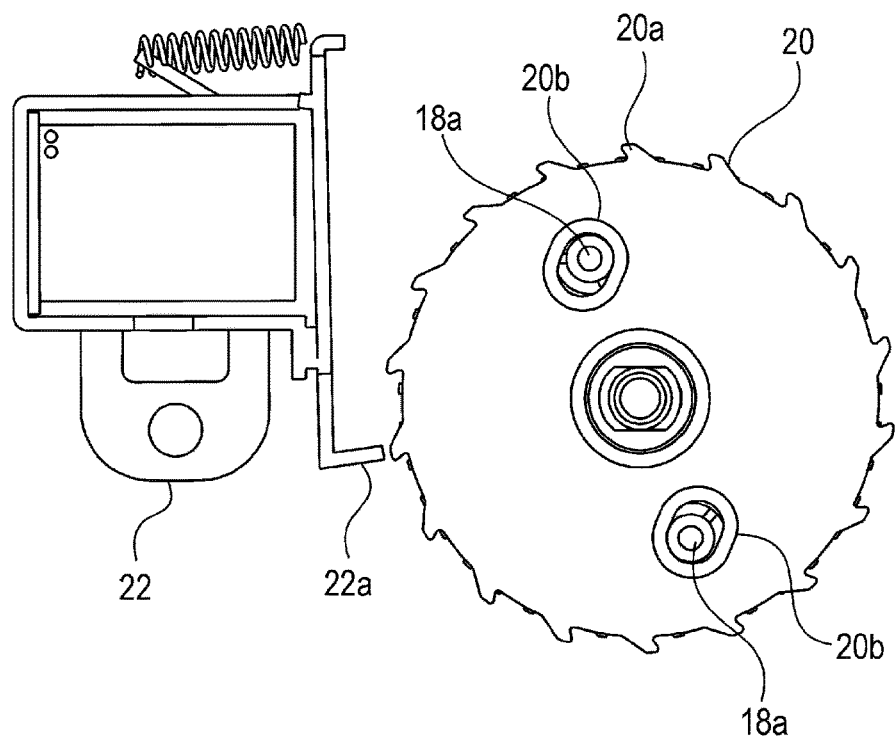
In FIG. 5, (a) and (b) are schematic views showing an operation of the driving force transmission mechanism during switch-back in Embodiment 1.
Figure 5:
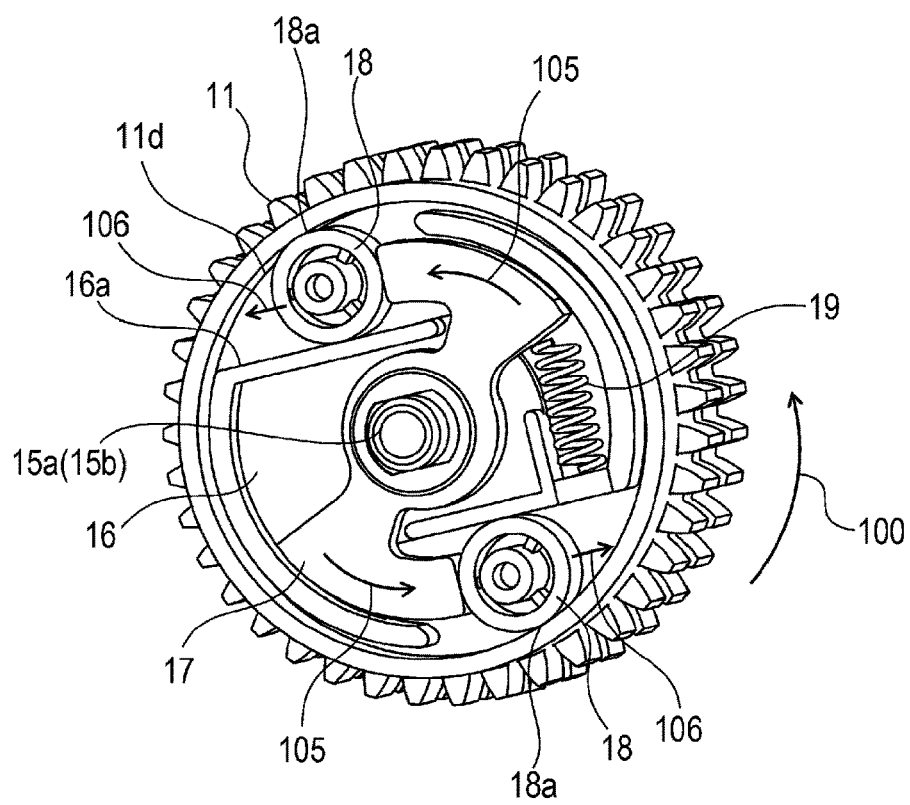

A structure and an operation of the driving force transmission mechanism 8 when the sheet P is subjected to switch-back at the sheet discharging portion 5 (i.e., when the operation of the sheet discharging roller 5a is switched from a normal rotation operation to a reverse rotation operation) will be described with reference to FIG. 5. This operation is a switching operation performed when the sheet P subjected to first surface (one surface) printing during double-side printing is fed from the sheet discharging portion 5 to a feeding path B. In FIG. 5, (a) and (b) are schematic views showing a state of an operation of each of the constituent members of the driving force transmission mechanism 8 during switching from normal rotation to reverse rotation, in which 8a) is the schematic view showing the operations of the clutch disk 20 and the solenoid 22, and (b) is the schematic view showing the operations of the input gear 11, the clutch holder 16, the retainer 17, the roller 18 and the urging spring 19 during the switching from the normal rotation to the reverse rotation.

As shown in (a) of FIG. 5, when the solenoid 22 generates an electromagnetic force by energization and attracts the armature (movable portion) 22a, a locked portion 20a of the clutch portion 20 is released from a locked state by the armature 22a. At this time, as shown in (b) of FIG. 5, the retainer 17 rotatably held by the clutch holder 16 rotates in an arrow 105 direction relative to the clutch holder 16 by receiving the urging force of the urging spring 19. The roller (constraining portion) 18 is moved in an arrow 106 direction by being urged (pressed) by the retainer 17, so that an outer peripheral portion (contacting portion) 18a thereof contacts a contacted portion 11d of the input gear 11. At this time, the input gear 11 rotates in the arrow 100 direction, and therefore, by a frictional force between the contacted portion 11d and the roller 18, the roller 18 receives a force for circulating and moving the roller 18 about the rotation shaft of the input gear 11 in the same direction as the arrow 100 direction. As a result, the roller 18 enters the narrow portion between the input gear 11 and the clutch holder 16, so that a strong frictional force acts on between the contacted portion 11d of the input gear 11 and a contacted portion 16a of the clutch holder 16. As a result, the input gear 11 and the clutch holder 16 are constrained and integrated with each other through the roller 18. When the input gear 11 and the clutch holder 16 are constrained by (integrated with) each other by the roller (constraining portion 18, by the recording material of the input gear 11 in the arrow 100 direction, also the carrier 15 integrated with the clutch holder 16 rotates about the shaft portions 15a and 15b in the arrow 100 direction. At this time, the roller 18 is urged by the urging spring 19 and is fixed in a state in which the roller 18 locks the clutch disk 20, so that the clutch disk 20 is in an integrated state with the clutch holder 16 by pins 18a of the roller 18 inserted into elongated circular holes (guiding holes) 20b. As a result, the clutch disk 20 rotates together with the carrier 15 in the arrow 100 direction by the action of the rotational driving force of the clutch holder 16 exerted on the clutch disk 20 through the pins 18a of the roller 18.

As shown in FIG. 4, the stepped gears 12A and 12B and the idler gears 13A and 13B are rotatably held by the rotation shafts 15Aa, 15Ba, 15Ab and 15Bb, respectively, provided on the carrier 15. However, the stepped gears 12A and 12B and the idler gears 13A and 13B are in a rest state relative to the associated rotation shafts by the integral rotation of the input gear 11 and the carrier 15. That is, also the stepped gears 12A and 12B and the idler gears 13A and 13B rotate (circulate and move) integrally with the carrier 15 in the arrow 100 direction. Accordingly, in this state, all of the constituent elements except for the solenoid 22 in the driving force transmission mechanism 8 rotate altogether in the arrow 100 direction, so that the rotational direction of the output gear 14 is the arrow 101 direction. As a result, the driving force of the output gear 14 is transmitted to the sheet discharging roller gear 5b through the sheet discharging roller driving gear train 7, so that the sheet discharging roller 5a rotates in a direction of drawing the sheet P to the feeding path B.

<Switching from Reverse Rotation to Normal Rotation>

Figure 6:
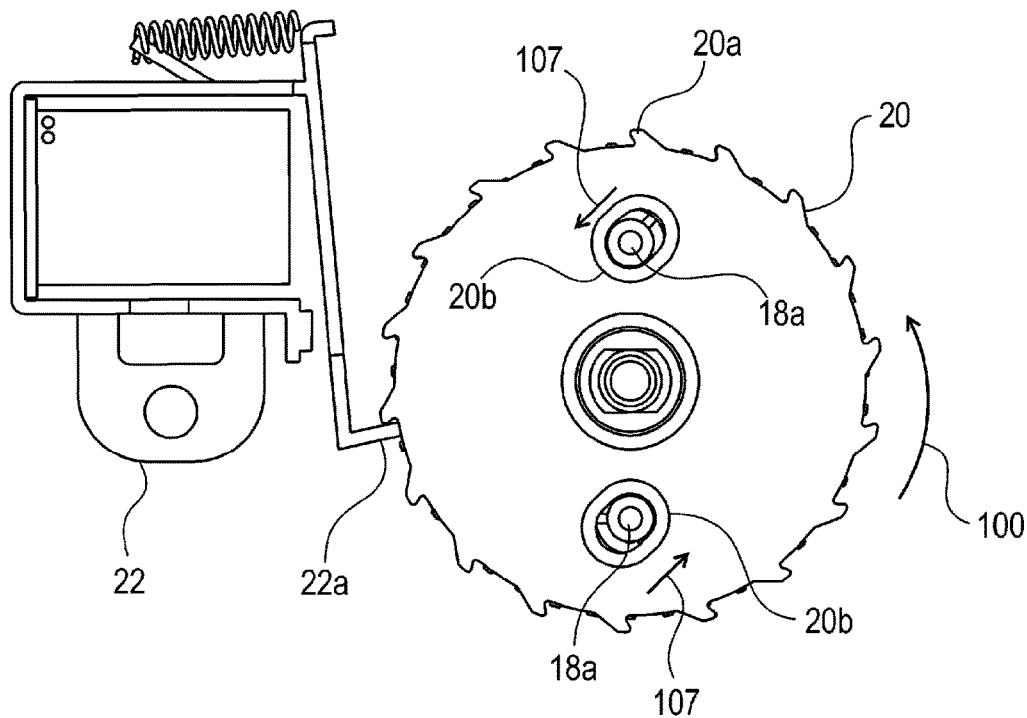
In FIG. 6, (a) and (b) are schematic views showing an operation of the driving force transmission mechanism during sheet discharge in Embodiment 1.
Figure 6:
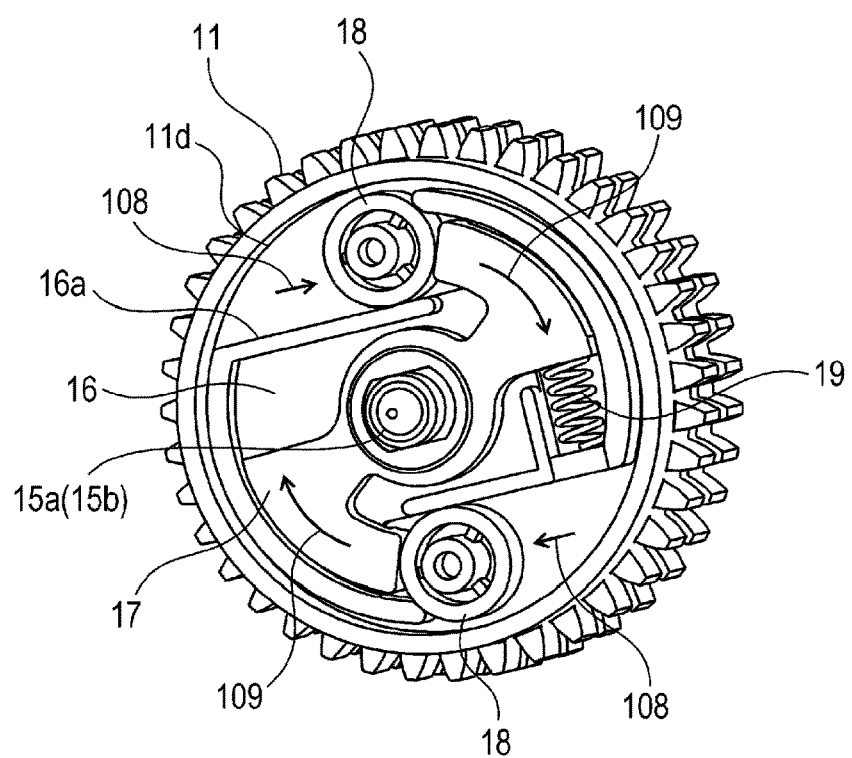

A switching when the sheet P is discharged onto the sheet discharge tray 10 (i.e., when the operation of the sheet discharging roller 5a is switched from the reverse rotation operation to the normal rotation operation) will be described with reference to FIG. 6. In FIG. 6, (a) and (b) are schematic views showing a structure and an operation of the driving force transmission mechanism 8 when the rotation of the sheet discharging roller 5a is switched from the reverse rotation to the normal rotation, in which 8a) is the schematic view showing the operations of the clutch disk 20 and the solenoid 22, and (b) is the schematic view showing the operations of the input gear 11, the clutch holder 16, the retainer 17, the roller 18 and the urging spring 19 during the switching from the reverse rotation to the normal rotation.

As shown in (a) of FIG. 6, when the energization to the solenoid 22 is switched from "ON" to "OFF", a free end of the armature 22a engages with (contacts) the locked portion (claw portion) 20a provided at an outer peripheral portion of the clutch disk 20 and stoops the rotation of the clutch disk 20 rotating in the arrow 100 direction At this time, the parts other than the clutch disk 20 continue rotation in the arrow 100 direction. For that reason, the roller 18 moves inside the clutch portion 21 in interrelation with an operation for guiding the pin 18a in the arrow 107 direction along the elongated circular hole 20b of the clutch disk 20. The elongated circular hole 20b guides the pin 18a so that a circulating locus of the pin 18a moves inside a circulating locus when the clutch disk 20 rotates together with the clutch portion 21 and the carrier 15.

As shown in (b) of FIG. 6, the pin 18 is guided along the elongated circular hole 20b, so that the roller 18 moves in an arrow 108 direction and rotates the retainer 17 in an arrow 109 direction against the urging force of the urging spring 19. By this movement, the roller (constraining portion) 18 is retracted from the contacted portion 11d of the input gear 11, so that the constraint of the input gear 11 and the clutch holder 16 is eliminated. When the retraction of the roller 18 is completed and the pin 18a moves to an end portion of the elongated circular hole 20b of the clutch disk 20 in a rotation shaft center side, the circulatory movement of the roller 18 about the shaft portions 15a and 15b of the carrier 15 in the arrow 100 direction is restricted (prevented) by the clutch disk 20. As a result, the rotation of the carrier 15 in the arrow 100 is restricted by the armature (movable portion) 22a.

When the rotation of the carrier 15 is at rest, as shown in FIG. 3, the stepped gears 12A and 12B are rotated about the rotation shafts 15Aa and 15Ba, respectively, of the carrier 15 by the rotational driving force transmitted from the input gear 11 in the arrow 103 direction. The idler gears 13A and 13B are rotated about the rotation shafts 15Ab and 15Bb, respectively, of the carrier 15 by the rotational driving force transmitted from the stepped gears 12A and 12B in the arrow 104 direction which is the opposite direction to the arrow 103 direction for the stepped gears 12A and 12B. Then, the rotational driving force is transmitted from the idler gears 13A and 13B to the output gear 14 and the rotational direction of the output gear 14 is reversed to the arrow 100 direction which is the rotational direction of the input gear 11, so that the rotational driving force in the arrow 102 direction is outputted. At this time, the rotational driving force of the output gear 14 is transmitted to the sheet discharging roller gear 5b through the sheet discharging roller driving gear train 7, so that the sheet discharging roller 5a rotates in the direction of discharging the sheet P onto the sheet discharge tray 10.

According to this embodiment, the driving force transmission mechanism 8 of the image forming apparatus has the following advantages.

The driving force transmission mechanism 8 is capable of simplifying a constitution of supporting the respective gears by providing the shaft portions (rotation center shafts) 15a and 15b generating through the entirety of the driving force transmission mechanism 8 and by supporting all of the gears by the carrier 15. Further, an internal gear is not used, and therefore, an entire size of the driving force transmission mechanism 8 is not influenced by a size of the idler gears to be engaged with the internal gear, so that downsizing of the driving force transmission mechanism 8 is easy. Further, the plurality of the stepped gears 12A and 12B and the idler gears 13A and 13B are disposed symmetrically with respect to the shaft portions (rotation center shafts) 15a and 15b of the driving force transmission mechanism 8, so that stability during rotation can be improved. In addition, the driving force is transmitted using the plurality of the stepped gears 12A and 12B and the idler gears 13A and 13B, so that a torque exerted per (one) gear can be alleviated, and therefore, compared with the conventional driving force transmission mechanism, the driving force transmission mechanism 8 in this embodiment is capable of withstanding use at a high-speed rotation under a high load.

In this embodiment, a constitution in which the carrier is used as one gear and is engaged (integrated) with the input gear was employed, but a constitution in which the carrier is used as the other gear and is engaged with the output gear may also be employed. Further, the stepped gears 12A and 12B may also be idler gears, not the stepped gears.

Embodiment 2

Figure 7:
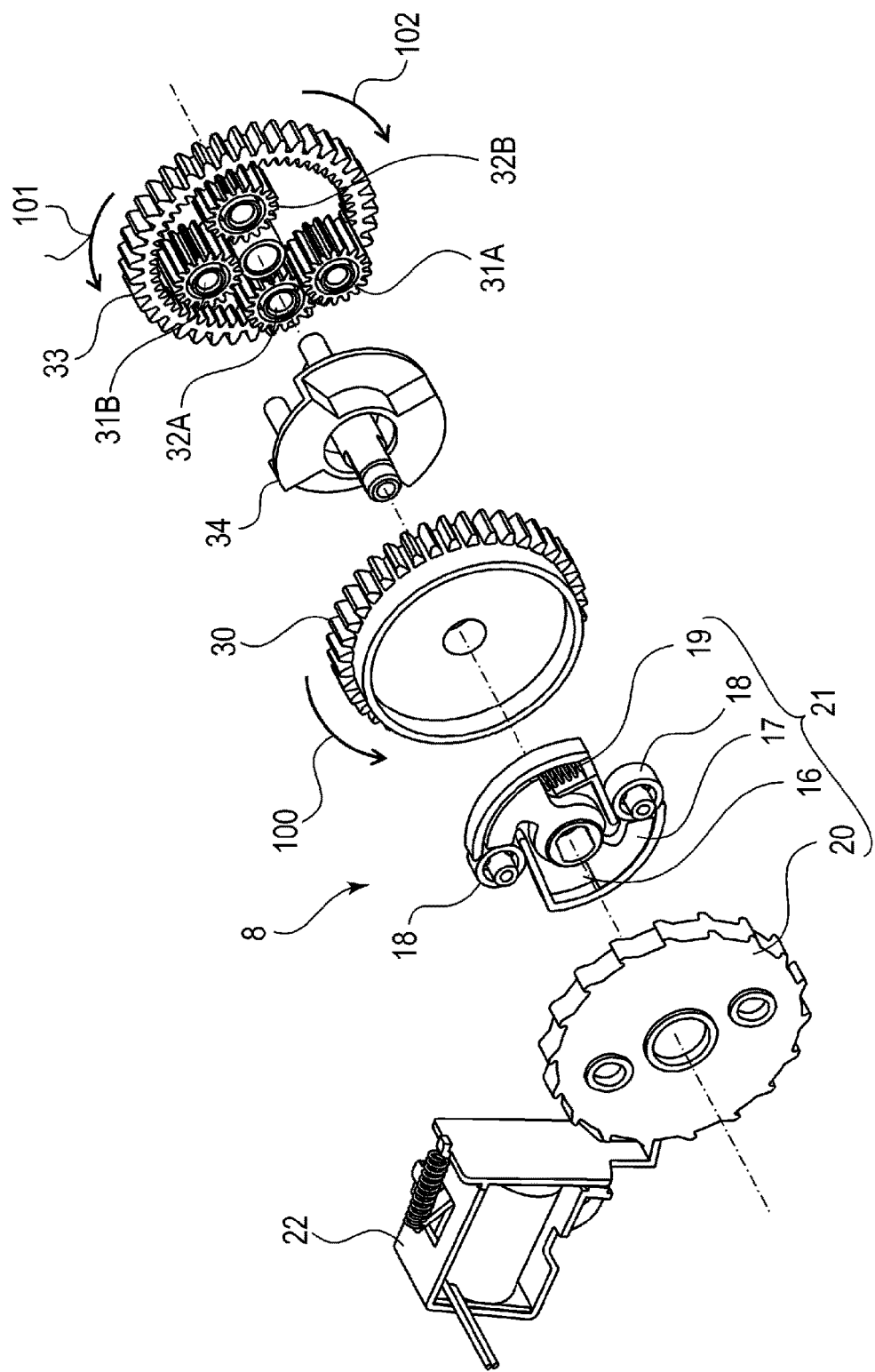
FIG. 7 is a perspective view showing a structure of a driving force transmission mechanism according to Embodiment 2.
Figure 8:
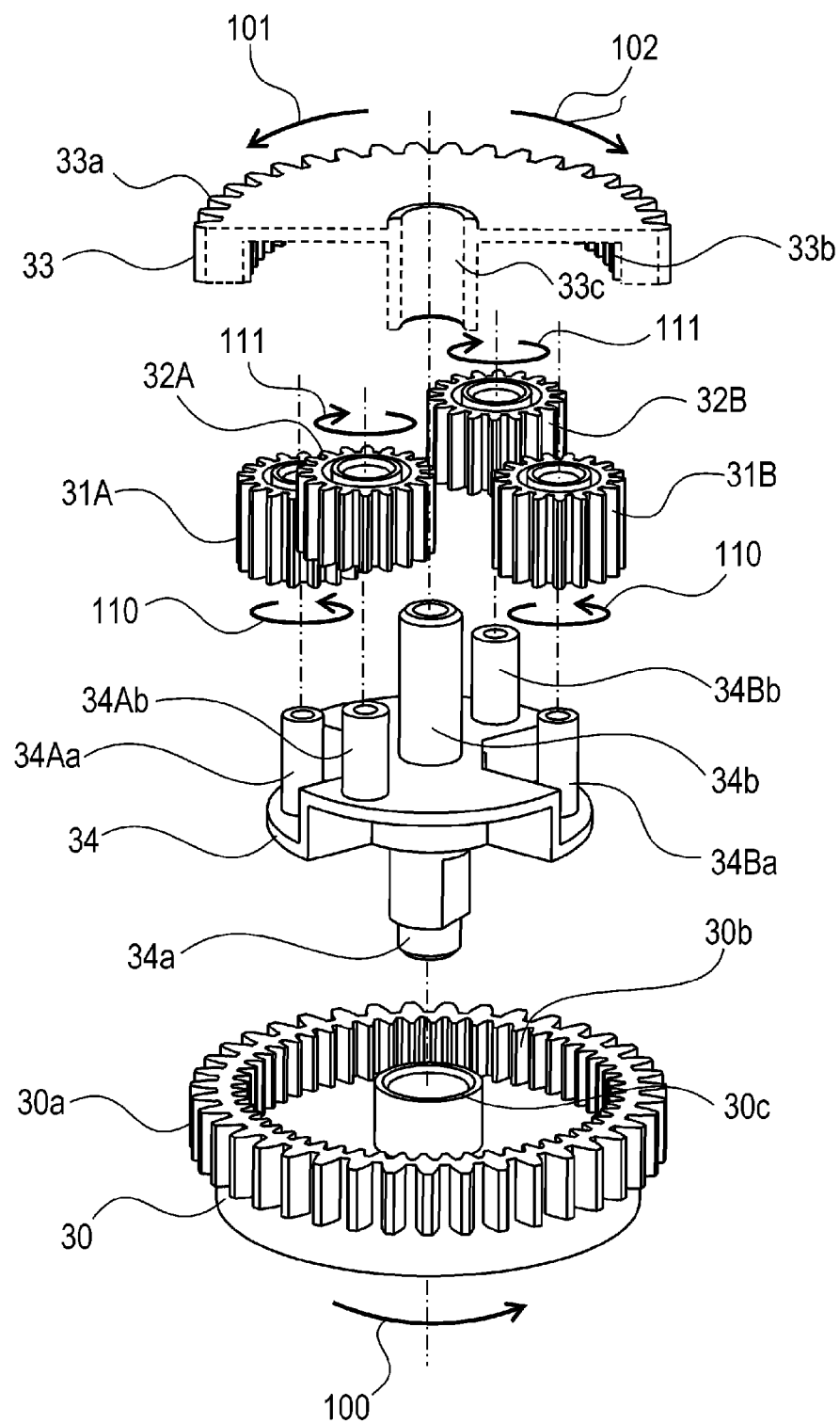
FIG. 8 is a perspective view showing a structure of gears and a carrier of the driving force transmission mechanism in Embodiment 2.

A driving force transmission mechanism according to Embodiment 2 of the present invention will be described with reference to FIGS. 7 and 8. In this embodiment, constituent elements having the same functions and constitutions as those in Embodiment 1 are represented by the same reference numerals or symbols and will be omitted from description. Matters which are not described in this embodiment are similar to those in Embodiment 1.

<Driving Force Transmission Mechanism>

A schematic constitution of the driving force transmission mechanism in this embodiment will be described with reference to FIG. 7. FIG. 7 is an exploded perspective view showing a structure of a driving force transmission mechanism 8 in this embodiment.

The driving force transmission mechanism 8 in this embodiment roughly includes an input gear 30, an output gear 33, idler gears 31A, 31B, 32A and 32B, a carrier 34 and a clutch portion 21. The input gear 30 rotates by receiving a driving force from the motor M. The output gear 33 outputs the driving force to the sheet discharging roller driving gear train 7. The idler gears 31A, 31B, 32A and 32B transmit the driving force from the input gear 30 to the output gear 33. The idler gears 31A and 31B are a plurality of first gears disposed symmetrically with respect to a rotation center (carrier shaft portion) of the driving force transmission mechanism 8 and are disposed at a plurality of positions which are symmetrical with respect to a rotation shaft center of the carrier 15. The idler gears 32A and 32B are a plurality of second gears disposed symmetrically with respect to a rotation center (carrier shaft portion) of the driving force transmission mechanism 8, and the idler gears are the same in number as the first gears are disposed at a plurality of positions which are symmetrical with respect to a rotation shaft center of the carrier 15.

The carrier 34 rotatably supports each of the input gear 30, the output gear 33, and the idler gears 31A, 31B, 32A and 32B, and the input gear 30 and the output gear 33 rotates coaxially with each other. The clutch portion 21 is constituted by the clutch holder 15, the retainer 18, the urging spring 19 and the clutch gear 20. The clutch holder 16 holds the teeth 17 and the urging spring 19 and is teethed with the carrier 34 through engagement (fitting). The retainer 17 rotates relative to the clutch holder 16 by the urging force of the urging spring 19 and presses the roller 18 movably disposed between the input gear 30 and the clutch holder 16. The pressed roller (constraining portion) 18 is sandwiched between the input gear 30 and the clutch holder 16 and thus constrains and integrates the input gear 30 and the clutch holder 16 with each other. The clutch disk 20 is constituted not only so as to control an operation of the roller 18 but also so that rotation of the clutch disk 20 itself is locked by the solenoid 20.

An engagement relationship among the input gear 30, the output gear 33 and the idler gears 31A, 31B, 32A and 32B will be described with reference to FIG. 8. FIG. 8 is an exploded perspective view showing a part of the structure of the driving force transmission mechanism 8, in which parts other than the gears and the carrier 34 are omitted from illustration.

The input gear 30 includes external teeth 30a to which a rotational driving force is inputted in engagement thereof with an unshown driving gear train, internal teeth 30b engaging with the idler gears 31A and 31B, and a hole 30c into which a shaft portion 34a of the carrier 34 is inserted. Here, external teeth refer to a gear portion where projections of teeth extend toward an outside with respect to the rotation center. On the other hand, internal teeth refer to a gear portion where projections of teeth extend toward the rotation center. The input gear 30 is rotatably supported by the shaft portion 34a of the carrier 34. The idler gears 31A and 31B are rotatably supported by rotation shafts 34Aa and 34Ba provided on the carrier 34, and engage with the input gear 30 and the idler gears 32A and 32B. The idler gears 32A and 32B are rotatably supported by rotation shafts 34Ab and 34Bb of the carrier 34, respectively. The output gear 33 includes external teeth 33a for outputting the rotational driving force to the sheet discharging roller driving gear train 7 (FIG. 1), internal teeth 33B engaging with the idler gears 32A and 32B, and a hole 33c into which the shaft portion 34b of the carrier 34 is inserted. The idler gears 31A and 31B engage with the internal teeth 30b of the input gear 30 and engage with the idler gears 32A and 32B, and the idler gears 32A and 32B engage with the internal teeth 33b of the output gear 33. As a result, the driving force is successively transmitted from the input gear 30 to the output gear 33.

The idler gears 31A and 31B receives the driving force from the input gear 30 and are rotated in the arrow 110 direction about the rotation shafts 34Aa and 34Ba, respectively, of the carrier 34. The idler gears 32A and 32B are rotated, about the rotation shafts 34Ab and 34Bb, respectively, of the carrier 34 by receiving the driving force from the idler gears 31A and 31B, in the arrow 111 direction which is the opposite direction to the arrow 110 direction for the idler gears 31A and 31B. Then, the rotational driving force is transmitted from the idler gears 32A and 32B to the output gear 33 and the rotational direction of the output gear 33 is reversed to the arrow 100 direction which is the rotational direction of the input gear 30, so that the driving force in the arrow 102 direction is outputted. At this time, the driving force of the output gear 33 is transmitted to the sheet discharging roller gear 5b through the sheet discharging roller driving gear train 7, so that the sheet discharging roller 5a rotates in the direction of discharging the sheet P onto the sheet discharge tray 10.

When the sheet P is subjected to switch-back in order to feed the sheet P from the sheet discharging portion 5 to the feeding path B, similarly as in Embodiment 1, the solenoid 22 is turned on, so that the locked state of the clutch disk 20 is eliminated. In order to constrain and integrate the input gear 30, the clutch portion 21 and the carrier 34 with each other by the roller 18, the idler gears 31A, 31B, 32A and 32B are at rest on the associated rotation shafts and rotate integrally with the carrier 34 in the arrow 100 direction. At this time, all of the constituent elements except for the solenoid 20 rotate in the arrow 100 direction, so that the rotational direction of the inputted driving force and the rotational direction of the outputted driving force are the same.

The driving force transmission mechanism 8 in this embodiment is capable of simplifying, compared with the driving force transmission mechanism disclosed in JP-A 2015-092104, a constitution of supporting the respective gears by providing the shaft portions (rotation center shafts) 34a and 34b generating through the entirety of the driving force transmission mechanism 8 and by supporting all of the gears by the carrier 15. Further, the idler gears 31A, 31B, 32A and 32B are disposed symmetrically with respect to the shaft portions (rotation center shafts) 34a and 34b of the driving force transmission mechanism 8, so that stability during rotation can be improved. Further, by dividing the drive transmission path into the paths, a torque exerted per (one) gear can be alleviated, and therefore, compared with the conventional driving force transmission mechanism, the driving force transmission mechanism 8 in this embodiment is capable of withstanding use at a high-speed rotation under a high load.

Embodiment 3

Figure 9:
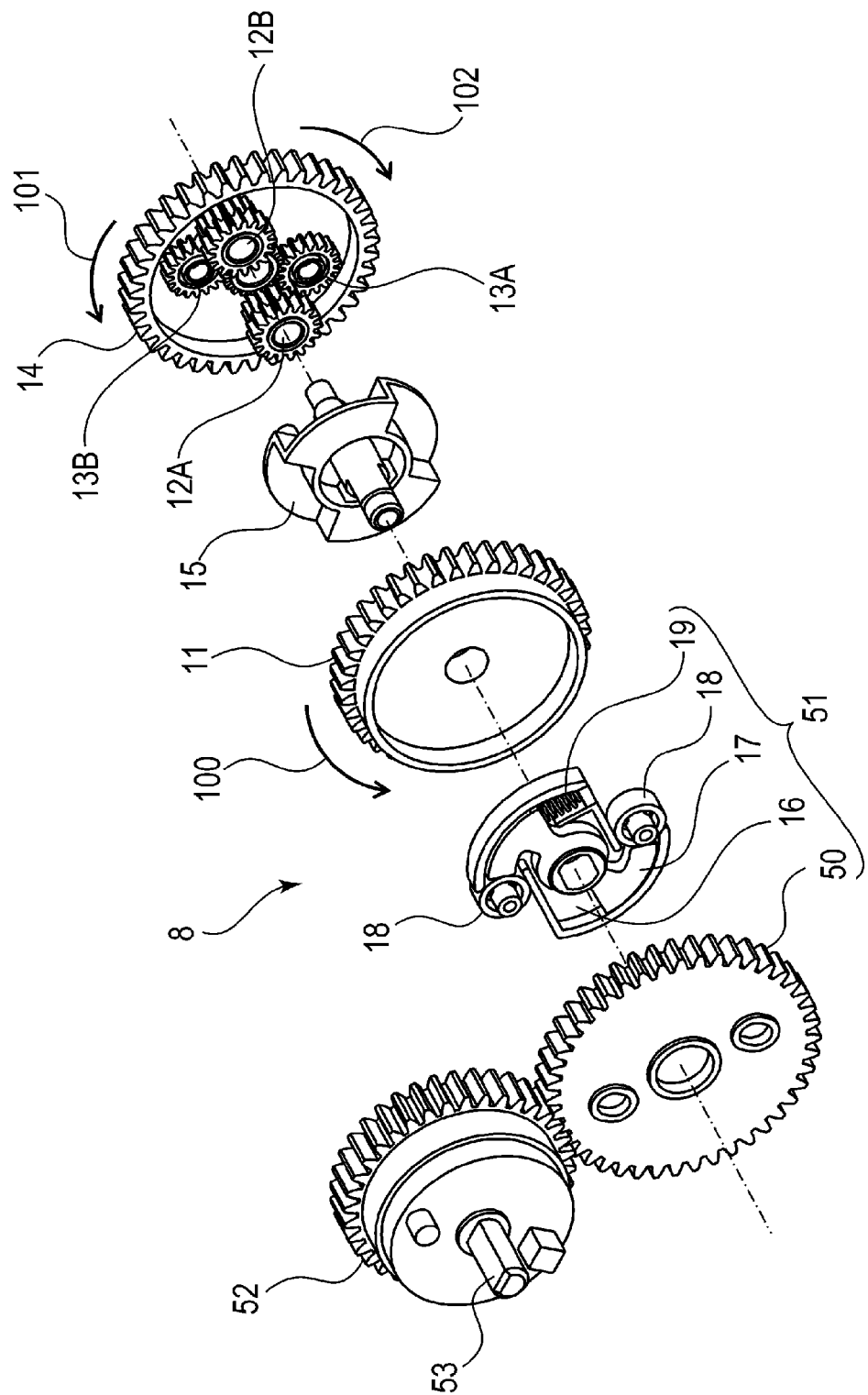
FIG. 9 is a perspective view showing a structure of a driving force transmission mechanism according to Embodiment 3.

A driving force transmission mechanism according to Embodiment 3 of the present invention will be described with reference to FIGS. 9 to 11. In this embodiment, constituent elements having the same functions and constitutions as those in Embodiment 1 are represented by the same reference numerals or symbols and will be omitted from description. Matters which are not described in this embodiment are similar to those in Embodiment 1.

A schematic constitution of the driving force transmission mechanism in this embodiment will be described with reference to FIG. 9. FIG. 9 is an exploded perspective view showing a structure of a driving force transmission mechanism 8 in this embodiment.

The driving force transmission mechanism 8 in this embodiment roughly includes an input gear 11, an output gear 14, stepped gears 12A and 12B, idler gears 13A and 13B, a carrier 15, a clutch portion 51, an electromagnetic clutch 52 and a shaft 53. The input gear 11 rotates by receiving a driving force from the motor M. The output gear 14 outputs the driving force to the sheet discharging roller driving gear train 7. The stepped gears 12A and 12B are the idler gears 13A and 13B transmit the driving force from the input gear 11 to the output gear 14.

The carrier 15 rotatably supports each of the input gear 11, the output gear 14, the stepped gears 12A and 12B and the idler gears 13A and 13B, and the input gear 11 and the output gear 13 rotates coaxially with each other. The clutch portion 51 is constituted by the clutch holder 15, the retainer 18, the urging spring 19 and a clutch gear (acted member) 50. The clutch holder 16 holds the teeth 17 and the urging spring 19 and is teethed with the carrier 15 through engagement (fitting). The retainer 17 rotates relative to the clutch holder 16 by the urging force of the urging spring 19 and presses the roller 18 movably disposed between the input gear 11 and the clutch holder 16. The pressed roller (constraining portion) 18 is sandwiched between the input gear 11 and the clutch holder 16 and thus constrains and integrates the input gear 11 and the clutch holder 16 with each other. The clutch gear 50 is constituted not only so as to control an operation of the roller 18 but also so that rotation thereof is stopped by the electromagnetic clutch 52 supported by the shaft 53. The electromagnetic clutch 52 as an actuator includes a gear portion 52a capable of selecting constraint of rotation of the clutch gear 50 and elimination of the constraint of the rotation of the clutch gear 50. The clutch gear 50 as the acted member includes a gear portion (constrained gear portion) 50a engaging with the gear portion 52a of the electromagnetic clutch 52.

To the input gear 11, rotation in a certain direction which is the arrow 100 direction is inputted. The number of teeth and engagement of each of the input gear 11, the stepped gears 12A and 12B, the idler gears 13A and 13B, and the output gear 14 are similar to those in Embodiment 1.

<Switching from Normal Rotation to Reverse Rotation>

A structure and an operation of the driving force transmission mechanism 8 when the sheet P is subjected to switch-back at the sheet discharging portion 5 will be described with reference to FIGS. 10 and (b) of FIG. 6 in Embodiment 1. FIG. 10 is a schematic view showing a state of an operation of each of the constituent members of the driving force transmission mechanism 8 during switching from normal rotation to reverse rotation, shows the operations of the clutch gear 50 and the electromagnetic clutch 52.

Figure 10:
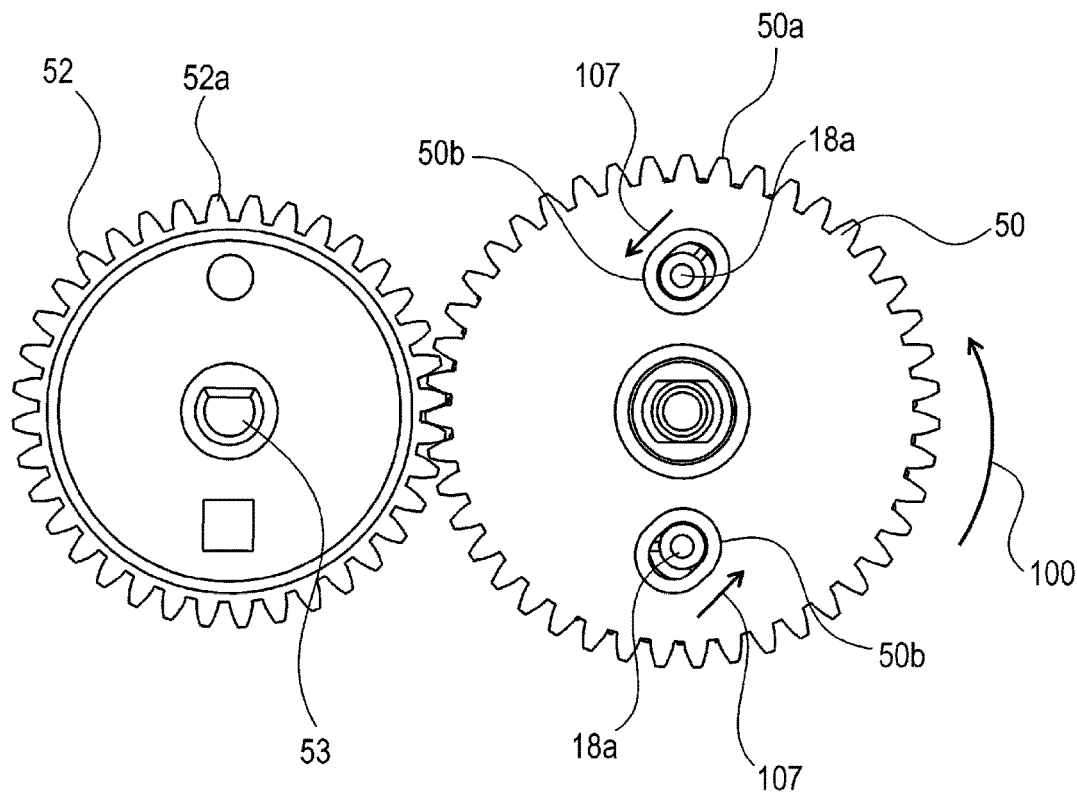
FIG. 10 is a schematic view showing an operation of the driving force transmission mechanism during sheet discharge in Embodiment 3.

As shown in FIG. 10, when energization to the electromagnetic clutch 52 is switched from an "OFF" state to an "ON" state, rotation of the gear portion 52a of the electromagnetic clutch 52 is constrained because of fixing of the shaft 53. The gear portion 50a of the clutch gear 50 engages with the gear portion 52a of the electromagnetic clutch 52, and therefore, by constraint of the rotation of the gear portion 52a of the electromagnetic clutch 52, the rotation of the clutch gear 50 in the arrow 100 direction is locked (constrained). At this time, the parts other than the clutch gear 50 continue rotation in the arrow 100 direction, and therefore, the roller 18 of the clutch portion 51 moves inside the clutch portion 51 in interrelation with an operation for guiding the pin 18a in the arrow 107 direction along the elongated circular hole 50b of the clutch gear 50. The elongated circular hole 50b guides the pin 18a so that a circulating locus of the pin 18a moves inside a circulating locus when the clutch gear 50 rotates together with the clutch portion 51 and the carrier 15.

As shown in (b) of FIG. 6, the pin 18 is guided along the elongated circular hole 50b, so that the roller 18 moves in an arrow 108 direction and rotates the retainer 17 in an arrow 109 direction against the urging force of the urging spring 19. By this movement, the roller 18 is retracted from the contacted portion 11d of the input gear 11, so that the constraint of the input gear 11 and the clutch holder 16 is eliminated. When the retraction of the roller 18 is completed and the pin 18a moves to an end portion of the elongated circular hole 20b of the clutch gear 50 in a rotation shaft center side, the circulatory movement of the roller 18 about the shaft portions (rotation center shafts) 15a and 15b of the carrier 15 in the arrow 100 direction is restricted (prevented) by the clutch gear 50. As a result, the rotation of the carrier 15 in the arrow 100 is restricted by the electromagnetic clutch 52.

When the rotation of the carrier 15 is at rest, as shown in FIG. 3, the stepped gears 12A and 12B are rotated about the rotation shafts 15Aa and 15Ba, respectively, of the carrier 15 by the rotational driving force transmitted from the input gear 11 in the arrow 103 direction. The idler gears 13A and 13B are rotated about the rotation shafts 15Ab and 15Bb, respectively, of the carrier 15 by the rotational driving force transmitted from the stepped gears 12A and 12B in the arrow 104 direction which is the opposite direction to the arrow 103 direction for the stepped gears 12A and 12B. Then, the rotational driving force is transmitted from the idler gears 13A and 13B to the output gear 14 and the rotational direction of the output gear 14 is reversed to the arrow 100 direction which is the rotational direction of the input gear 11, so that the rotational driving force in the arrow 102 direction is outputted. At this time, the rotational driving force of the output gear 14 is transmitted to the sheet discharging roller gear 5b through the sheet discharging roller driving gear train 7, so that the sheet discharging roller 5a rotates in the direction of drawing the sheet P into the feeding path B.

<Switching from Reverse Rotation to Normal Rotation>

Figure 11:
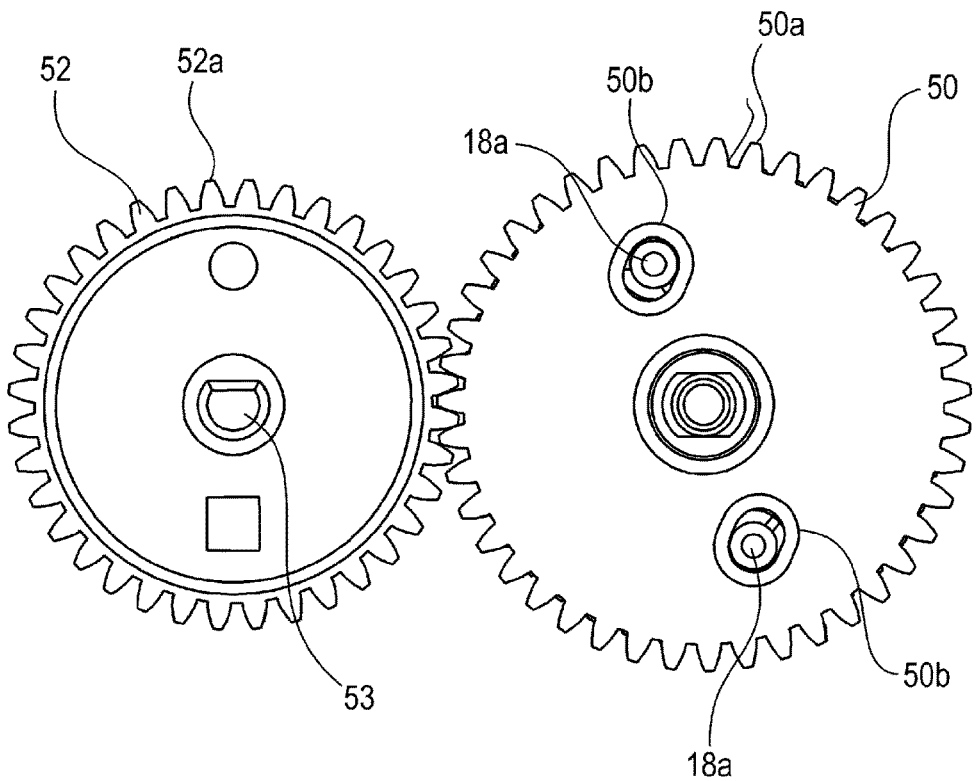
FIG. 11 is a schematic view showing an operation of the driving force transmission mechanism during switch-back in Embodiment 3.

With reference to FIG. 11 and (b) of FIG. 5 in Embodiment 1, switching of drive (driving force) of the sheet discharging roller 5a (i.e., switching from the reverse rotation operation to the normal rotation operation) when the sheet P is discharged onto the sheet discharge tray 10 will be described. FIG. 11 is a schematic view showing a structure and an operation of the driving force transmission mechanism 8 when the rotation of the sheet discharging roller 5a is switched from the reverse rotation to the normal rotation and shows operations of the clutch gear 50 and the electromagnetic clutch 52.

As shown in FIG. 11, when the energization to the electromagnetic clutch 52 is changed from "ON" to "OFF" and the rotation of the gear portion 52a is not constrained, the clutch gear 50 is released from the constrained state by the electromagnetic clutch 52. At this time, as shown in (b) of FIG. 5, the retainer 17 rotates in the arrow 105 direction by receiving the urging force of the urging spring 19 and moves the roller 18 in the arrow 106 direction. When the roller 18 contacts a contacted portion 11d of the input gear 11, a frictional force is generated between the roller 18 and the contacted portion 11d of the input gear 11 and between the roller 18 and a contacted portion 16d of the clutch holder 16, so that by the action of the roller 18, the input gear 11 and the clutch holder 16 are constrained and integrated with each other. By the recording material of the input gear 11 in the arrow 100 direction, also the carrier 15 integrated with the clutch holder 16 rotates about the shaft portions (rotation center shafts) 15a and 15b of the carrier 15 in the arrow 100 direction. At this time, the roller 18 is in a state in which the roller 18 constrains and integrates the input gear 11 and the clutch holder 16 with each other by the urging force of the urging spring 19 through the retainer 17 and by the rotational frictional force in the arrow 100 direction received from the contacted portion 11d of the input gear 11. The clutch gear 50 is in an integrated state with the clutch holder 16 and the carrier 15 by pins 18a of the roller 18 inserted into elongated circular holes 50b. As a result, the clutch gear 50 rotates together with the carrier 15 in the arrow 100 direction by the action of the rotational driving force of the carrier 15 exerted on the clutch gear 50 through the pins 18a of the roller 18.

Similarly as Embodiment 1, the stepped gears 12A and 12B and the idler gears 13A and 13B are rotatably supported by the carrier 15, but are in a rest state relative to the associated rotation shafts by the integral rotation of the input gear 11 and the carrier 15. That is, also the stepped gears 12A and 12B and the idler gears 13A and 13B rotate (circulate and move) integrally with the carrier 15 in the arrow 100 direction. Accordingly, in this state, all of the constituent elements except for the electromagnetic clutch 52 and the shaft 53 in the driving force transmission mechanism 8 rotate altogether in the arrow 100 direction, so that the rotational direction of the output gear 14 is the arrow 101 direction. As a result, the driving force of the output gear 14 is transmitted to the sheet discharging roller gear 5b through the sheet discharging roller driving gear train 7, so that the sheet discharging roller 5a rotates in the direction of discharging the sheet P onto the sheet discharge tray 10.

In the above-described driving force transmission mechanism 8 in Embodiment 1, it takes a certain time from input of a signal to the actuator until the drive is switched, and therefore, a response time may desirably be always constant in order to carry out stable sheet feeding. An error in response time in switching of the drive largely depends on a response performance of the actuator. In a constitution using the solenoid 22 in Embodiment 1, when the rotation of the clutch disk 20 is locked, an operation of moving the armature 22a of the solenoid 22 to the locking position depends on a spring force. For that reason, a response error is liable to become large.

In this embodiment, the constraint of the clutch gear 50 and the elimination of the constraint of the clutch gear 50 are realized using, as the actuator, the electromagnetic clutch 52 which carries out the constraint and the elimination only by the "ON" and the "OFF" of the energization, so that the response error can be reduced compared with the constitution using the solenoid 22.

In this embodiment, the state in which all of the parts other than the electromagnetic clutch 52 and the shaft 53 are constrained and integrated with each other and rotate in the same direction is used as a state of the normal rotation (in the direction in which the sheet discharging roller 5a discharges the sheet P onto the sheet discharge tray 10). As a result, during the one-side printing, there is no transmission of the drive by rotation between the stepped gear 12A and the idler gear 13A and between the stepped gear 12B and the idler gear 13B, and therefore, abrasion of gear teeth surfaces can be suppressed, and a driving noise from the engagement portion of the gears can be reduced.

In the above-described embodiments, as one gear integrated with the carrier 15 by the clutch portion 21 or 51, the input gear 11 or 30 is described as an example, but the present invention is not limited thereto. The one gear integrated with the carrier 15 by the clutch portion 21 or 51 may also be used as the output gear 14 or 33. Also by this constitution, effects similar to those in the above-described embodiments can be obtained.

Further, in the above-described embodiments, an example in which the sheet discharging roller is used as a rotatable member for transmitting the rotational driving force by switching the rotational direction between the normal rotation and the reverse rotation by the driving force transmission mechanism was described, but the present invention is not limited thereto. The present invention is also effective even in another rotatable member when the rotatable member needs to transmit the unidirectional rotational driving force inputted from the driving source by switching the rotational direction between the normal rotation and the reverse rotation.

Further, in Embodiments 1 and 2 described above, an example of a constitution in which the pin 18a provided on the roller 18 is interrelated with the clutch disk 20 by being moved along the elongated circular hole (guiding hole) 20b provided in the clutch disk 20 was described, but the present invention is not limited thereto. A constitution in which the roller (constraining portion) is provided with the elongated circular hole (guiding hole) and the clutch disk (acted member) is provided with the pin and in which the roller and the clutch disk are interrelated with each other may also be employed. Also by this constitution, effects similar to those in the above-described embodiments can be achieved.

According to the present invention, in the driving force transmission mechanism arbitrarily switches the rotation direction between the normal rotation and the reverse rotation with respect to the inputted unidirectional rotational driving force, it is possible to realize downsizing by simplification of the constituent elements and improvement of stability during the rotation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-139066 filed on Jul. 14, 2016, which is hereby incorporated by reference herein in its entirety.

What is claimed is:

1. A driving force transmission mechanism capable of changing a rotational direction of an output gear, the driving force transmission mechanism comprising:
   a carrier including a shaft portion at a center thereof;
   an input gear to which a driving force is inputted from a driving source, said input gear including first teeth to which the driving force is inputted, and second teeth on an output side of said input gear, said input gear being rotatably held about the shaft portion of said carrier;
   a plurality of first gears engaging with the second teeth of said input gear, said first gears being provided symmetrically with each other with respect to the shaft portion of said carrier and rotatably held by said carrier;
   a plurality of second gears, each one of said plurality of second gears engaging with one of said first gears, respectively, said second gears being provided symmetrically with each other with respect to the shaft portion of said carrier and rotatably held by said carrier;
   an output gear engaging with said second gears and rotatably held by the shaft portion of said carrier;
   a clutch portion configured to integrate or disintegrate one of said input gear and said output gear with said carrier, said clutch portion including a rotary disk, a clutch holder, a roller, and an urging member, said clutch holder being rotatable with said carrier, said roller being provided between said clutch holder and one of said input gear and said output gear, said urging member being configured to urge said roller toward the one of said input gear and said output gear; and
   an actuator configured to restrict rotation of said rotary disk,
   wherein, when said actuator does not restrict the rotation of said rotary disk, said roller is moved between said clutch holder and the one of said input gear and said output gear by an urging force of said urging member such that said input gear, said carrier and said output gear are integrated with each other and said output gear is rotated together with said input gear in a first direction by a frictional force between said roller and the one of said input gear and said output gear, and
   wherein, when said actuator restricts the rotation of said rotary disk, said roller is not urged by said urging member to a position between said clutch holder and the one of said input gear and said output gear and moved away from the one of said input gear and said output gear such that (i) said clutch holder is brought to a state where said clutch holder is rotatable with the one of said input gear and said output gear, (ii) a rotational driving force is configured to be transmitted from said input gear to said output gear via said first gears and said second gears, and (iii) said output gear is rotated in a second direction opposite to the first direction.

2. A driving force transmission mechanism according to claim 1, wherein said actuator includes a movable portion capable of moving between an acting position where said actuator acts on said rotary disk and a non-acting position where said actuator does not act on said rotary disk,
   wherein, when said movable portion is in the acting position, said actuator restricts the rotation of said rotary disk, and
   wherein when said movable portion is in the non-acting position, said actuator does not restrict the rotation of said rotary disk.

3. A driving force transmission mechanism according to claim 2, wherein said rotary disk includes a claw portion engageable with said movable portion when said movable portion of said actuator moves to the acting position.

4. A driving force transmission mechanism according to claim 1, wherein said actuator includes a gear portion capable constraining and eliminating the constraint of said rotary disk.

5. A driving force transmission mechanism according to claim 4, wherein said rotary disk includes a constrained gear portion engageable with said gear portion of said actuator.

6. A driving force transmission mechanism according to claim 4, wherein said roller and said rotary disk include a mechanism in which a pin provided on one of said roller and said rotary disk is engaged in a guiding hole provided in the other one of said roller and said rotary disk, said roller and said rotary disk being interrelated with each other by movement of said pin along said guiding hole.

7. A driving force transmission mechanism according to claim 4, wherein a contact portion of said roller is contactable to a contacted portion provided on said one gear.

8. An image forming apparatus for forming an image on a recording material, comprising:
- an image forming portion configured to form the image on one surface of the recording material;
- a rotatable member configured to feed the recording material passing through said image forming portion;
- a driving force transmission mechanism according to claim 1, said driving force transmission mechanism being capable of switching a rotational direction of said rotatable member rotated by a rotational driving force transmitted to said rotatable member; and
- a feeding portion configured to feed the recording material, to an upstream side of said image forming portion, reversed in feeding direction by reversing the rotational direction of said rotatable member.

9. A driving force transmission mechanism according to claim 1, wherein said roller circulates and moves along an internal circumference of the one of said input gear and said output gear by said urging member.

10. A driving force transmission mechanism according to claim 1, wherein an internal circumference of the one of said input gear and said output gear has smooth surface along which said roller circulates and moves.

11. A driving force transmission mechanism according to claim 1, wherein said roller is one of a plurality of rollers provided between said clutch holder and the one of said input gear and said output gear, respectively, said rollers being provided symmetrically with each other with respect to the shaft portion of said carrier.

12. A driving force transmission mechanism according to claim 1, wherein the first teeth and the second teeth of said input gear include projections of teeth extend toward an outside with respect to the shaft portion of said carrier.

* * * * *